KURT STEISSLINGER
HORST SIMON
INVENTORS

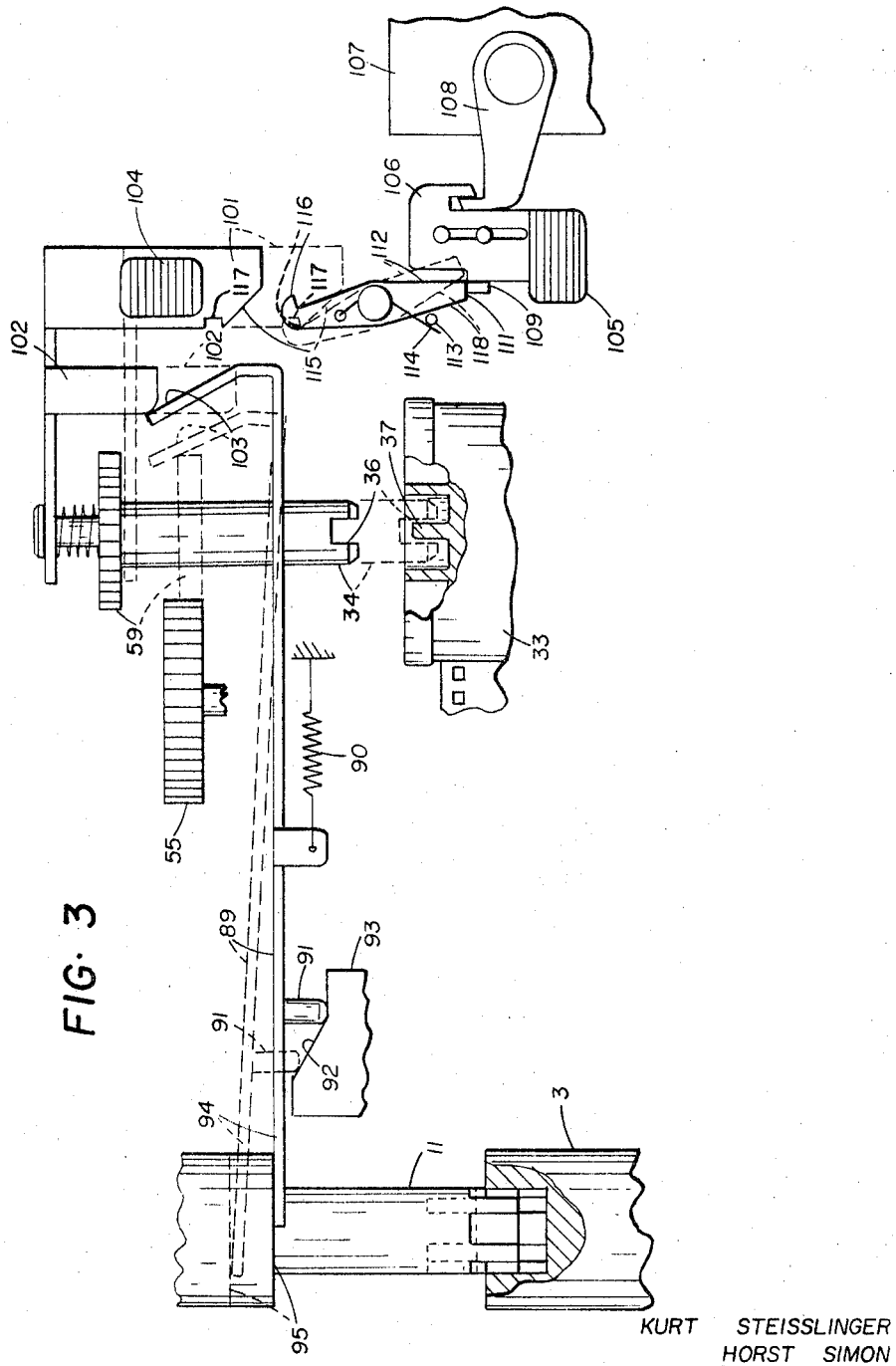

3,423,041
FILM WINDING AND REWINDING DEVICE

Kurt Steisslinger, Stuttgart-Hedelfingen, and Horst Simon, Fellbach, near Stuttgart, Germany, assignors to Eastman Kodak Company, Rochester, N.Y., a corporation of New Jersey
Filed July 18, 1967, Ser. No. 654,153
Claims priority, application Germany, Sept. 23, 1966, K 60,319
U.S. Cl. 242—71.6
Int. Cl. G03b 1/04
6 Claims

ABSTRACT OF THE DISCLOSURE

A camera provided with a film advancing and rewinding mechanism selectively operable by a single operating member, including means for withdrawing the spool engaging rewinding member from the film supply chamber to facilitate loading the camera and means for coordinating the operation of the film advancing and rewinding mechanism with that of a film metering system.

*Cross-reference to related applications*

Figure 1:
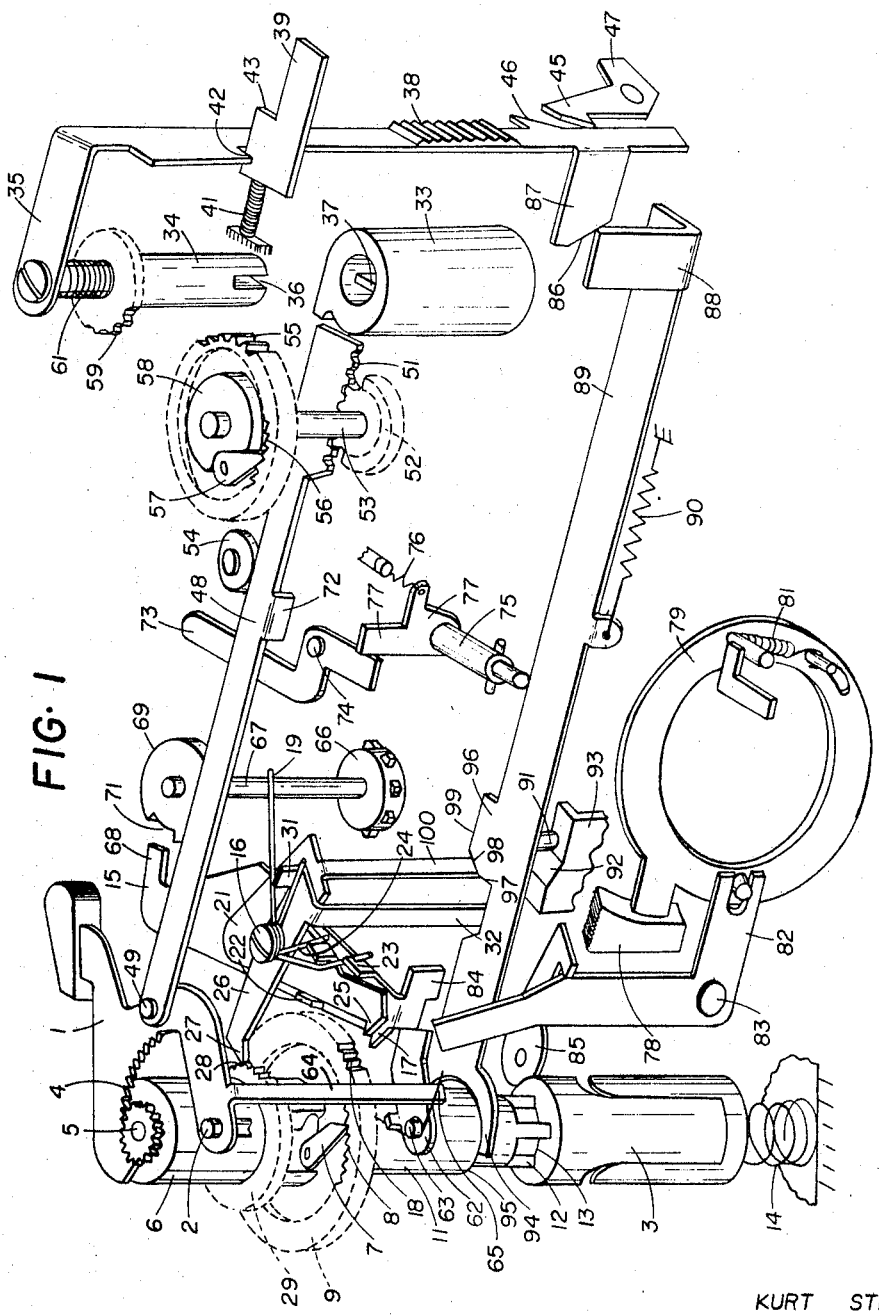

Reference is made to commonly assigned copending U.S. patent application Ser. No. 612,201, entitled "Film Advancing and Rewinding Mechanism," filed Jan. 27, 1967 in the name of Hubert Nerwin.

The present invention relates to photographic cameras in which a single operating member is adjustable either to advance or rewind a film strip loaded therein, an example of such a camera being disclosed in commonly assigned pending United States patent application Ser. No. 612,201, entitled "Film Advancing and Rewinding System," filed in the name of Hubert Nerwin on Jan. 27, 1967. More particularly, the invention contemplates a magazine loaded camera of this type in which the film supply core in the film magazine is engaged by a rotatable rewinding member during the rewinding operation, with means being provided for withdrawing that member from the core when the rewinding operation has been completed to facilitate the removal and replacement of the magazine without interference with the rewinding member and to allow the core of the replacement magazine to rotate freely as film is unwound therefrom and advanced for exposure. Additionally, the invention provides means for operatively associating such a dual function film advancing and rewinding mechanism with the camera film metering and double exposure prevention system, and in an alternate embodiment, for correlating the adjustment of the advancing and rewinding mechanism with a cover door latching device to prevent the cover of the camera from being opened while the film is still in the process of being advanced.

Figure 2:
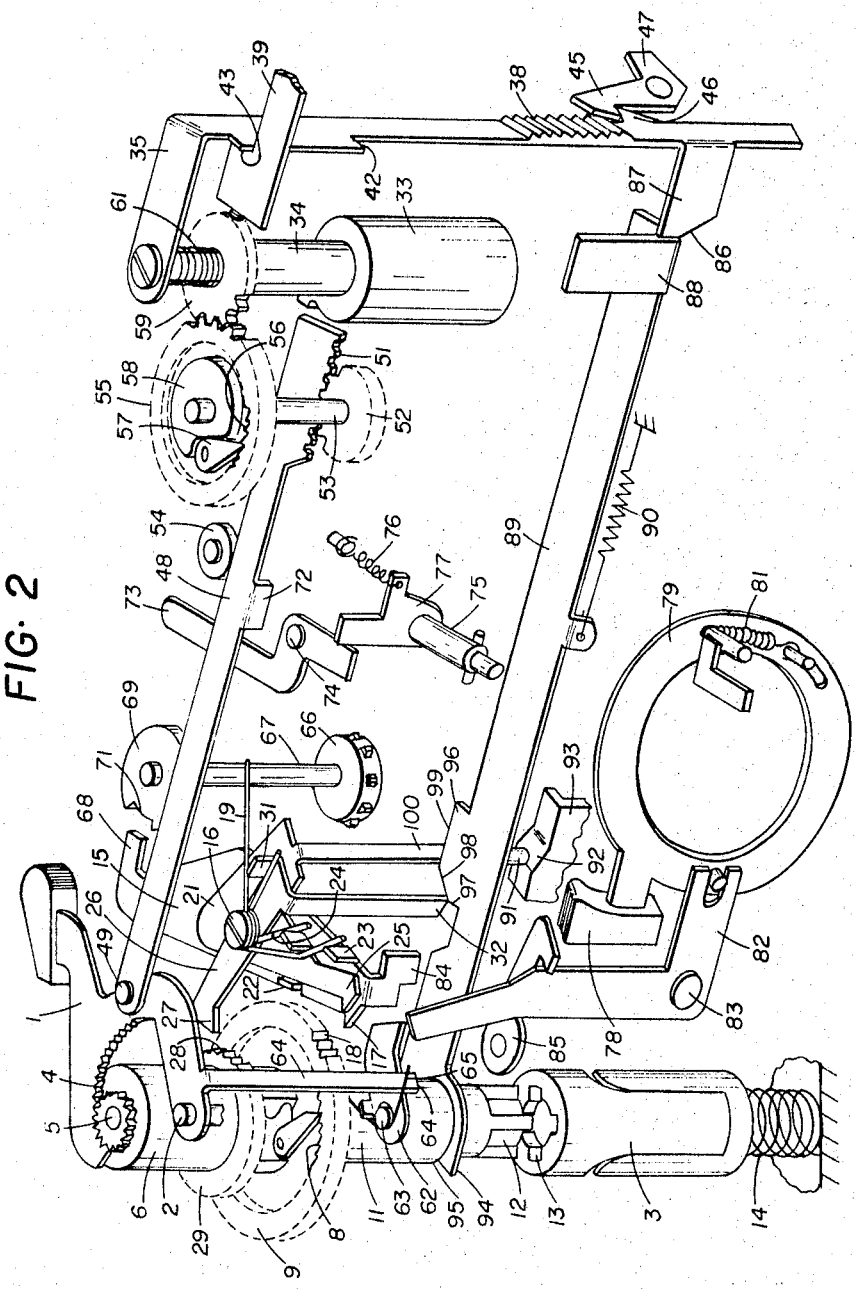

Various means for accomplishing the invention will be apparent from the following detailed description of specific embodiments thereof, reference being made to the accompanying drawings in which like reference numerals denote like elements and in which:

FIG. 1 is a schematic view in perspective of a preferred embodiment of the invention when the mechanism is adjusted to its film advancing mode of operation;

FIG. 2 corresponds to FIG. 1 and illustrates the mechanism adjusted to rewind film onto the film supply core in the film magazine; and FIG. 3 is a front elevational schematic view showing modified portions of the mechanism comprising an alternate embodiment of the invention shown in FIGS. 1 and 2.

Referring to FIGS. 1 and 2, the illustrated camera mechanism includes an operating lever 1, pivotally supported by stud 2, the axis of which is parallel to that of rotatably supported film take-up core 3. The take-up core is adapted to engage the end of a film strip loaded into the camera and to wind film onto the core as it is rotated, in the manner well known in the art. Lever 1 includes an internal gear segment 4 meshed with a pinion 5 atop rotatable driving member 6 positioned in coaxial alignment with the take-up core. A pawl 7 is pivotally supported on the driving member 6 in resilient contact with internal ratchet teeth 8 of rotatable ratchet wheel member 9, to impart counterclockwise movement of the driving member to the ratchet wheel member. Clutch member 11 extends downwardly from ratchet wheel member 9 in rotatable driving relation therewith and is movable axially between the position shown in FIG. 1, in which its splined end portion 12 enters a mating hole 13 in the core to couple the core rotatively to the ratchet wheel member, and the position shown in FIG. 2 in which the core and the clutch member are disengaged. Accordingly, it will be seen that, when the clutch member is engaged with the core, counterclockwise movement of lever 1 will cause the core to rotate in a corresponding direction to wind film thereon, whereas the core will remain stationary under the frictional influence of spring 14 during clockwise movement of the lever.

Adjacent the ratchet wheel member 9, a pawl lever 15 is pivotally supported by a stationary pivot screw 16, with the end tooth 17 of the lever urged toward external teeth 18 on the wheel member by a spring 19. A second pawl lever 21 is also pivoted on screw 16 immediately above lever 15 and is movable relative thereto between ears 22 and 23 against the influence of a spring 24, which resiliently maintains end tooth 25 of lever 21 in slightly staggered alignment with tooth 17 of lever 15. When lever 15 is allowed to pivot to bring teeth 17 and 25 into contact with ratchet teeth 18, as shown in broken lines, the ratchet wheel will therefore be blocked from rotating in a counterclockwise direction, thereby also blocking counterclockwise movement of lever 1. As is known in other similar ratchet devices, the employment of the two staggered pawl teeth, rather than a single pawl tooth, enables the ratchet wheel to be provided with only half the number of teeth that would otherwise be required to enable it to be blocked at predetermined small angular increments, thereby allowing the teeth to be made correspondingly stronger.

Above the two pawl levers 15 and 21, a similar pawl arm 26 is also pivotally supported on pivot screw 16 with its nose portion 27 adjacent ratchet teeth 28 on rim 29 of driving member 6. One end of spring 24 engages an ear 31 on pawl arm 26 and biases it in a counterclockwise direction relative to the two pawl levers to a position defined by the engagement of depending finger 32 on arm 26 with the adjacent edge of lever 21. Thus, when the levers and the arm are positioned as shown in FIG. 1, nose portion 27 of arm 26 is in blocking engagement with teeth 28 to prevent clockwise movement of the driving member and lever 1; but, as the pawl levers move into engagement with the ratchet wheel member, the pawl arm 26 disengages the driving member 6.

Near the end of the camera opposite the take-up core, means not shown define a chamber adapted to receive laterally a film magazine 33 and to support the magazine in parallel relation to the take-up core. Rewinding shaft 34 is rotatably and slidably supported in coaxial alignment with the magazine and is movable by slide member 35 between the raised position shown in FIG. 1, out of engagement with the magazine, and the lowered position shown in FIG. 2, in which slot 36 in the end portion of shaft 34, serving as a clutch member, engages web 37 in the film supply spool housed in the magazine. The slide member is moved manually by an externally accessible slide button 38 and is releasably retained in its raised position by a blocking slide 39 adapted to be moved by spring 41 to the position shown in FIG. 1 when upward movement of the slide moves shoulder 42 beyond edge surface 43 of the blocking slide. To move the slide to its lower position, the externally accessible end of blocking slide 39 is depressed to release the slide, which may then be moved downward by means of button 38 to the position shown in FIG. 2, in which it is similarly retained by a pivotal latch member 45 engageable with projection 46 and adapted to be disengaged therefrom by manual movement of arm 47 extending through the camera housing.

Rack arm 48 is pivotally attached to operating lever 1 by a pin 49 and is reciprocable thereby, with the rack portion 51 of the arm being maintained in meshing engagement with pinion 52 on rotatably supported shaft 53 by a guide roller 54. A gear 55 is rotatable on shaft 53 and includes an internal ratchet tooth surface 56 resiliently engaged by a pawl 57 carried by a hub 58 affixed to the shaft, whereby the gear is rotated positively in a counterclockwise direction in response to corresponding rotation of pinion 52. When slide member 35 is in the position shown in FIG. 1, reciprocation of lever 1 will cause pinion 52 to reciprocate rotatively, thereby causing gear 55 to move in the same manner. However, when the slide member is in its lower position, shown in FIG. 2, pinion 59 on shaft 34 is meshed with gear 55 and is frictionally retarded from rotating freely by spring 61, which also serves to urge the shaft downwardly, so that, if slot 36 and web 37 are angularly misaligned when pinion 59 moves into engagement with gear 55, the rotation of the shaft will cause the slot to engage the web as the shaft moves to a slightly lower position. Therefore, as lever 1 is moved in a counterclockwise direction, gear 55 is driven in the same direction, imparting clockwise rotation to the spool in the magazine engaged by shaft 34. However, during clockwise movement of the lever, the spool remains stationary as the frictional influence of spring 61 resists clockwise movement of gear 55, causing it to remain stationary as pawl 57 overrides ratchet teeth 56. Accordingly, it will be seen that, when the slide member is in its lower position, reciprocative movement of lever 1 will cause the film supply spool to rotate intermittently in a clockwise direction to rewind film into the magazine.

In FIG. 1 the illustrated camera components are shown after an exposure has been made and before the camera shutter has been recocked and the film advanced in preparation for a subsequent exposure. At this stage of the camera operation, clutch member 11 is engaged with takeup core 3; rewinding shaft 34 is withdrawn from magazine 33; nose portion 27 of pawl arm 26 is engaged with ratchet teeth 28 on the driving member; and teeth 17 and 25 of the respective pawl levers 15 and 21 are held out of engagement with ratchet wheel 9 by a stop member 62 pivoted on pin 63 and held in contact with arm 64 of lever 1 by spring 65. Therefore, as the lever is moved in a counterclockwise direction, the winding core rotates similarly to wind film thereon as the film is thereby advanced along a path in which its lateral metering perforations engage and rotate a metering sprocket 66 rotatably supported by shaft 67. When the lever has been moved in a counterclockwise direction through approximately a 30 degree angle, stop member 62 is moved by arm 64 out of engagement with pawl lever 15, allowing that lever and its associated lever 21 to move toward engagement with the ratchet wheel. However, such movement is blocked, with the lever teeth still beyond teeth 18 of the ratchet wheel, by the engagement of lug 68 on lever 15 with the periphery of blocking disk 69 carried by shaft 67, which has been rotated sufficiently in a counterclockwise direction by the movement of the film to move recess 71 out of alignment with the lug. Therefore, the lever can continue to be moved in a counterclockwise direction but cannot be moved in the opposite direction due to the continuing engagement of pawl arm 26 with ratchet teeth 28. As the lever is moved further, the film continues to advance and to rotate sprocket 66 while disk 69 maintains pawl levers 15 and 21 out of engagement with the ratchet wheel. When such film movement has caused the blocking disk to rotate sufficiently to realign recess 71 with lug 68, in response to the advancement of the film by one exposure frame, the lug enters the recess, thereby allowing the pawl levers to rotate so that one of the teeth thereon engages and blocks further counterclockwise rotation of the ratchet wheel to arrest the film advancing operation. Simultaneously, the movement of the pawl levers itno contact with the ratchet wheel causes pawl arm 26 to be disengaged from the driving member so that lever 1 can be moved in a clockwise direction to its initial position.

During the above-described film advancing operation, the counterclockwise movement of lever 1 moves rack lever 48 to the left, as illustrated, bringing lug 72 thereon into engagement with shutter cocking lever 73 mounted on pivot stud 74 and pivoting the lever to cock the camera shutter mechanism, not shown, by rotating shutter cocking shaft 75 against the influence of spring 76 as lever 73 displaces arm 77 on the shutter shaft. When the film advancing operation has been completed, the shutter can be actuated by depressing push button member 78 to rotate shutter release ring 79 against the influence of spring 81. In addition to operating the shutter, such movement of the ring rocks pawl release lever 82 in a clockwise direction about pivot stud 83, whereby the upper end of the release lever engages depending ear 84 on pawl lever 15 to return the pawl levers and the pawl arm to their illustrated positions as the upper end of the release lever moves to the right. Such movement of lever 15 also disengages ear 84 from stop member 62, which returns to its illustrated position to restore the mechanism to its previous condition in which operation of lever 1 will advance the film and recock the shutter.

When button 78 is released, spring 81 returns ring 79 and lever 82 to their illustrated positions and subsequent depression of the button is prevented by the engagement of double exposure prevention latch 85 with pawl release lever 82. At the end of each film advancement cycle, however, latch 85 is withdrawn from lever 82 in response to movement of pawl lever 15 to the position in which further rotation of the winding core is prevented. The mechanism for so withdrawing the latch from engagement with lever 82 is not illustrated, but might comprise a depending pin on pawl lever 15 adapted to engage an arm on the latch to rotate the latter in a counterclockwise direction when tooth 17 of lever 15 moves into engagement with the ratchet wheel. When the subsequent depression and release of push button 78 resets the pawl levers as shown, the latch reengages lever 82 and thus precludes a second operation of the shutter until the film has been advanced again.

To enable the film to be rewound into the magazine after it has been exposed, blocking slide 39 is depressed to release slide member 35, which is then moved to its lower position by slide button 38, where it is releasably retained by latch member 45 as shown in FIG. 2. As previously explained, such movement of slide 35 moves rewinding shaft 34 into driving engagement with the film spool in the magazine and meshes pinion 59 with gear 55 so that reciprocation by lever 1 will rotate the film supply spool intermittently in a rewinding direction. Additionally, as slide member 35 moves downward, the sloped edge surface 86 of lug 87 thereon engages ear 88 extending upwardly from slide bar 89 and cams the bar to the left, against the influence of spring 90, to the position shown in FIG. 2. During such movement of the bar, downwardly extending support pin 91 thereon rides up the sloped surface 92 of stationary cam plate 93, raising the left end of the bar, which defines a shifting fork 94 engageable with downwardly facing shoulder 95 on clutch member 11. As the shifting fork is so raised, the clutch member is thereby lifted out of hole 13 in the winding core, in opposition to a spring, not shown, located within the clutch member and urging it downwardly. Accordingly, the winding core is now free to rotate, opposed only by the slight frictional influence of spring 14.

Before the rewinding operation can be carried out, the driving member 6 and the ratchet wheel must be disengaged by the pawl arm 26 and the pawl levers, respectively, so that lever 1 can be reciprocated freely. Also, sprocket 66 must be free to rotate in order not to interfere with the rewinding movement of the film engaged therewith. To accomplish these requirements, slide bar 89 includes a lateral projection 96 defining a shoulder 97, a sloped cam surface 98 and an edge surface 99. When the slide bar is in the film advancing position shown in FIG. 1, projection 96 is adjacent depending finger 32 on pawl arm 26 and a similar depending finger 100 on pawl lever 21, but is beyond the path of movement of the fingers so that the movement of the pawl levers and the pawl arm is not restricted by the slide bar. Upon movement of the slide bar to the rewinding position shown in FIG. 2, however, shoulder 97 engages the end of finger 32 and rocks pawl arm 26 in a clockwise direction to disengage tooth 27 from rim 29 of the driving member; and cam surface 98 displaces finger 100 into contact with edge surface 99, thereby rotating levers 15 and 21 in a counterclockwise direction to disengage them from the ratchet wheel and to withdraw lug 68 on lever 15 from blocking disk 69 so that sprocket 66 can rotate freely. Additionally, it should be noted that the shutter cannot be operated during the rewinding operation inasmuch as latch 85 remains engaged with release lever 82 as long as lever 15 is maintained out of engagement with ratchet wheel 9, as previously described.

Upon completion of the rewinding operation, the operator releases latch member 45 and returns slide member 35 to its raised position, thereby restoring the mechanism to the condition shown in FIG. 1, in which rewinding shaft 34 is withdrawn from the film magazine. Accordingly, when the cover door of the camera is opened, the rewound magazine can be removed and replaced without interference with the rewinding shaft.

The embodiment of the invention shown in FIG. 3 comprises a modification of slide member 35 and the latching devices associated therewith, with unmodified components being identified by the same reference numerals employed in the foregoing description of FIGS. 1 and 2. In this embodiment, slide member 101 includes a lug 102 which engages a sloping cam surface 103 at the end of slide bar 89 and moves the slide bar to the left, against the influence of spring 90, when the slide member is moved downwardly by means of slide button 104 to engage shaft 34 with the film supply spool in magazine 33 and to disengage clutch member 11 from take-up core 3.

A door latch slide 105, located below slide member 101, includes an ear 106 adapted to retain the camera cover door 107 in a closed position, by engaging hook member 108 on the door. To open the door, the latch slide must be moved upwardly to release the hook member, but when the slide member is in its raised position such upward movement of the latch slide is prevented by the alignment of lug 109 thereon with the end surface 111 of pivotal latch member 112, biased toward stop pin 113 by spring 114. During movement of the slide member 101 to its lower position, however, sloped edge surface 115 thereon engages the upper end of latch member 112 and cams the latch member 112 in a counterclockwise direction to enable tooth 116 thereof to engage notch 117 to latch the slide member 101 in its lower position, as shown in broken lines. With the latch member 112 so engaged with notch 117, its lower end surface 111 is displaced from lug 109, which is now aligned with slanted latch member surface 118. Therefore, the latch slide 105 can now be moved upwardly, whereby the cover door will be released and tooth 116 will be withdrawn from notch 117 as lug 109 encounters edge surface 118 of the latch member and cams that member in a counterclockwise direction. When the latch tooth disengages notch 117, the slide member is returned to its raised position by cam surface 103 acting on lug 102 under the influence of spring 90. Accordingly, this arrangement insures that the camera cannot be opened unintentionally during the film winding operation and automatically restores the mechanism to its film advancing condition when the cover door is opened to remove and replace the rewound magazine.

Although the invention has been described in considerable detail with reference to certain preferred embodiments thereof, it will be understood that variations and modifications can be effected within the spirit and scope of the invention as described hereinabove and as defined in the appended claims.

We claim:
1. In a camera adapted to receive a film supply member, said camera including:
  (a) a manually operable operating member,
  (b) a film take-up member, and
  (c) a film transport mechanism driven by said operating member and adjustable selectively
    (1) to drive said take-up member to wind film thereon from a film supply member received by said camera, and
    (2) to drive a film supply member received by said camera to rewind film thereon from said take-up member;
the improvement in means for adjusting said mechanism comprising:
  (d) a clutch member rotatable by said operating member and movable between
    (1) an operative position in which said clutch member directly engages a film supply member received by said camera to impart film rewinding movement thereto, and
    (2) an inoperative position in which said clutch member is withdrawn beyond the position occupied by a film supply member received by said camera, and
  (e) means for moving said clutch member between said operative and inoperative positions.

2. The invention defined by claim 1 in which said operating member comprises a reciprocable lever connected by ratchet means to a gear member intermittently rotatable in a predetermined direction in response to reciprocation of said lever, said clutch member including a pinion adapted to mesh with said gear when said clutch member is in said operative position to translate rotation of said gear into rotation of said clutch member, said pinion being disengaged from said gear when said clutch member is in said inoperative position.

3. The invention defined by claim 1 wherein said clutch member moving means comprises:
  (a) a slide member to move said clutch member between said operative and inoperative positions,
  (b) an externally accessible adjusting element for moving said slide member, and
  (c) means for retaining said slide member releasably in either of two positions corresponding to said operative and inoperative positions of said clutch member.

4. The invention defined by claim 1 wherein said clutch member moving means comprises:
  (a) an externally adjustable element to move said clutch member selectively to said operative and inoperative positions,
  (b) coupling means shiftable between
    (1) a first location in which said take-up member is operatively engaged with said operating member for rotation in a film winding direction in response to movement of said operating member, and (2) a second location in which said take-up member is operatively disengaged from said operating member, and (c) means responsive to said adjustable element for shifting said coupling means (1) to said first location when said clutch member is moved by said adjustable element to said inoperative position, and (2) to said second location when said clutch member is moved by said adjustable element to said operative position.

5. In a camera adapted to receive a film supply member, said camera including:

(a) a movable operating member,
(b) a film take-up member,
(c) a film transport mechanism driven by said operating member and adjustable selectively to
  (1) a first condition in which said take-up member is driven by said operating member to wind film thereon from a film supply member received by said camera, and to
  (2) a second condition in which a film supply member received by said camera is driven by said operating member to rewind film thereon from said film take-up member, and
(d) a movable cover door member; the improvement comprising:
(e) a latch member movable between
  (1) a first location in which said cover door member is retained by said latch member in a closed position, and
  (2) a second location in which said cover door is disengaged by said latch member for movement to an open position, and (f) coordinating means responsive to the adjustment of said film transport mechanism for retaining said latch member in said first location while said mechanism is adjusted to said first condition.

6. In a camera adapted to receive a film supply member, said camera including:

(a) a movable operating member,
(b) a film take-up member, and
(c) a film transport mechanism driven by said operating member and adjustable selectively to
  (1) a first condition in which said take-up member is driven by said operating member to wind film thereon from a film supply member received by said camera to thereby advance a portion of said film past an exposure location, and to
  (2) a second condition in which a film supply member received by said camera is driven by said operating member to rewind film thereon from said take-up member;
the improvement comprising:
(d) a film metering device adapted to control advancement of said portion of said film, and
(e) disabling means for disabling said film metering device in response to the adjustment of said film transport mechanism to said second condition.

References Cited

UNITED STATES PATENTS

| | | | |
|---|---|---|---|
| 2,140,445 | 12/1938 | Mihalyi | 242—71.6 |
| 2,643,826 | 6/1953 | Knauf | 242—71.4 |
| 2,984,428 | 5/1961 | Bernhard | 242—71.6 |

NATHAN L. MINTZ, *Primary Examiner.*